United States Patent
Bartolome Pascual et al.

(10) Patent No.: US 6,587,449 B1
(45) Date of Patent: Jul. 1, 2003

(54) METHOD AND SYSTEM FOR DISTRIBUTING RADIO CHANNELS IN A RADIOCOMMUNICATIONS SYSTEM

(75) Inventors: Purificación Bartolome Pascual, Madrid (ES); Daniel Gomez Mateo, Madrid (ES); Alberto Heras Brandin, Madrid (ES); Jesus Izquierdo Arce, Madrid (ES); Eugenio Lopez Almansa, Madrid (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/455,488

(22) Filed: Dec. 6, 1999

(30) Foreign Application Priority Data

Sep. 24, 1999 (EP) .............................. 99500172

(51) Int. Cl.[7] .................................. H04J 3/00
(52) U.S. Cl. ................... 370/336; 370/337; 455/404; 455/436; 455/452; 455/450; 455/453; 455/509
(58) Field of Search ................. 455/436, 452, 455/450, 453, 509, 404; 370/335, 337

(56) References Cited

U.S. PATENT DOCUMENTS

| | | | | |
|---|---|---|---|---|
| 5,448,750 A | * | 9/1995 | Eriksson et al. ............ 455/33.1 |
| 5,748,624 A | * | 5/1998 | Kondo ......................... 370/347 |
| 5,794,148 A | * | 8/1998 | Mamaghani et al. ........ 455/435 |
| 5,940,743 A | * | 8/1999 | Sunay et al. .................. 455/69 |
| 6,023,622 A | * | 2/2000 | Plaschke et al. ............. 455/452 |
| 6,101,389 A | * | 8/2000 | Koizumi et al. ............. 455/450 |
| 6,167,260 A | * | 12/2000 | Azam et al. ................. 455/426 |
| 6,339,697 B1 | * | 1/2002 | Ranta ........................... 455/63 |
| 6,393,268 B1 | * | 5/2002 | Biedermann ................. 455/404 |

* cited by examiner

*Primary Examiner*—William Trost
*Assistant Examiner*—Danh C Le
(74) *Attorney, Agent, or Firm*—Sughrue Mion, PLLC

(57) ABSTRACT

Method for distributing radio channels in a radiocommunications system in which a fixed unit (11-j) allocates radio channels to a plurality of remote units (12-1 to 12-m), and in which the radio channels are defined by a time slot of a frame and a pseudo-random sequence.

Processor means carry out an analysis of the quality requirements in relation with an incoming, or in process, or foreseen incoming call, and of a list of occupied channels prepared by the fixed unit (11-j), with the object of releasing, by means of a handover procedure, a busy channel on the list and belonging to a time slot having the quality closest to that required for the call to which it is desired to allocate a channel. The fixed unit (11-j) allocates to said call the time slot that includes the released radio channel.

19 Claims, 1 Drawing Sheet

METHOD AND SYSTEM FOR DISTRIBUTING RADIO CHANNELS IN A RADIOCOMMUNICATIONS SYSTEM

OBJECT OF THE INVENTION

The present invention relates to a radiocommunications system in which a fixed unit communicates with a set of remote units, fixed and/or mobile, employing code division multiple access (CDMA) and time division multiple access (TDMA) techniques together, in order to implement radio communications. Consequently, various communications can be established simultaneously over a time slot in a frame. The invention proposes a method and a system for distributing the radio resources of the TD-CDMA system, so that radio channel allocation is carried out according to previously established criteria, with the aim that the greatest number of call set-up requests attain their objective and that the channel distribution is optimised at all times.

STATE OF THE ART

Generally, a radiocommunications system is connected through fixed units to a transport network such as a public switched telephone network (PSTN), and to the subscribers through remote units, fixed and/or mobile, distributed throughout the coverage area associated with each fixed unit.

The last mile, or final connection, to the subscribers is made over cable, or by radio access, or by a mix of the two techniques. The system has a tree structure, whereby each fixed unit communicates by radio with the remote units that lie within its coverage area.

In order to implement the communications, the radiocommunications system uses code division multiple access (CDMA) and time division multiple access (TDMA) techniques together.

Thus, a radio channel is determined by a carrier frequency, a time slot of a frame and a spread spectrum pseudo-random sequence (since these sequences are orthogonal or quasi-orthogonal with respect to each other, it is to possible to distinguish the radio channels from each other).

It is well known that there are different factors which act negatively reducing the traffic-bearing capacity of the TD-CDMA system, such as interference experienced by a communication in a time slot due to other communications set up in the same time slot, deficient power control, signal attenuation due to the distance between a remote unit and the fixed unit, among others.

When a remote unit makes a call set-up request, the circumstance can arise of this being unsuccessful, even when there are channels free in the cell associated with the fixed unit, for the reason that none of the free radio channels surpass a minimum quality threshold as a consequence of the interference level produced by other radio channels employed in communications already set up within a given time slot of a TD-CDMA frame, for example.

A further drawback arises when a subscriber makes a call set-up request and requires a radio link with a high bit rate for the signal to be transmitted and the TD-CDMA system is unable of attending said request even when there are transmission capacity, because the transmission capacity is distributed inside the TD-CDMA frame. For example, a user requires all the transmission capacity of a time slot, but in all the time slots there are radio channels occupied with calls in process, though not in the maximum possible number. As a consequence, the possibility of failure during the set-up request phase of a communication is increased and the capacity of the TD-CDMA system is diminished.

It can also occur that at a given moment the operational power required by the calls in process is greater than that necessary as a result of the distribution of calls over the different time slots.

That described above represents a drawback for the rapid deployment of TD-CDMA radiocommunications systems, since neither the market nor the operators will press for their implementation.

Therefore, it is necessary to develop a method which permits the distribution of communications already set up within the time slots of the TD-CDMA frame for the purpose of releasing radio channels, in some time slots of the TD-CDMA frame, in order to satisfy the incoming call set-up requests and to optimise the distribution of calls in process, although the above procedure may bring with it the need for handover processes of communications in process without degrading their quality.

In this manner, the users furthest from the fixed unit or with significant path loss, or who require greater transmission capacity, shall encounter their call set-up possibilities improved. The traffic capacity of the TD-CDMA system shall be managed in a more efficient and optimised manner.

CHARACTERISATION OF THE INVENTION

An object of the method of the present invention is to facilitate a method that dynamically distributes the radio channels of a TD-CDMA radiocommunications system so that its traffic capacity is maximised, while optimising the quality of links occupied with calls in process. For the purposes of the present invention, the link quality is to be understood in general terms including both the bit rate and the power transmitted. Consequently, a high quality can signify a suitable bit rate according to the particular requirements in each case, or a minimum transmitted power, or a combination of both factors.

Another object of the method of the present invention is that call setup requests be attended in the event that the TD-CDMA system has the theoretical capacity available, without increasing the number of cells necessary that would bring with it an increment of the operational complexity and of the overall cost of the TD-CDMA system.

The radiocommunications system implements duplex communications, and is divided into a plurality of cells each one comprising at least one fixed unit and a set of remote units, fixed and/or mobile, located within the cell. The fixed unit, by means of a radio interface, is linked by radio with the respective radio interfaces of the remote units.

The fixed unit allocates radio channels to the remote units for the purpose of setting up communications over them. A radio channel is defined by a time slot and a pseudo-random sequence, it being possible to set up various simultaneous calls over the same time slot in a TD-CDMA frame.

The method of the present invention manages the distribution of the radio channels of a radiocommunications system in order to optimise the power transmitted, the transmission capacity, or a combination of both factors. According to the method of the invention, a channel is allocated to an incoming call, or to a foreseen incoming call, or to a call in process, comprising the steps of:

a) setting-up of a list of radio channels occupied with calls in process based on said quality requirements;

b) analysis of the quality requirements of a call to which it is desired to allocate a channel;

c) comparison of said analysis with said list in order to find on said list an occupied radio channel in accordance with a predetermined selection criterion;

d) release of said radio channel in said time slot; and e) allocation to said call of a radio channel within said time slot.

Thus a list of radio channels occupied with calls in process is established; and an analysis of the quality requirements of a call set-up request for incoming, in process or foreseen incoming call is performed.

The result of the analysis performed is compared with the list of occupied radio channels in order to determine which radio channel on the list is to be released. An occupied radio channel is released which belongs to the time slot having the quality closest to that required in the call to which it is desired to allocate a channel. Once the radio channel has been released, the fixed unit allocates a radio channel to the incoming call request within the time slot incorporating the released radio channel.

In accordance with one aspect of the invention, said selection criterion comprises the selection of a channel which corresponds to a time slot having the quality closest to that required in said call to which it is desired to allocate a channel.

In accordance with another aspect of the invention, said selection criterion comprises the selection of a channel which corresponds to a time slot the corresponding channel of which is released with the lowest number of handovers from among the different sets of possible handovers to be made.

In accordance with another aspect of the invention said selection criterion comprises the selection of a channel which corresponds to a first time slot which is situated adjacent in time to a second time slot, forming thereby a double time slot to be allocated to a call.

BRIEF DESCRIPTION OF THE FIGURES

A more detailed explanation of the invention is provided in the following description, based on the attached figures, in which.

DESCRIPTION OF THE INVENTION

Figure 1:
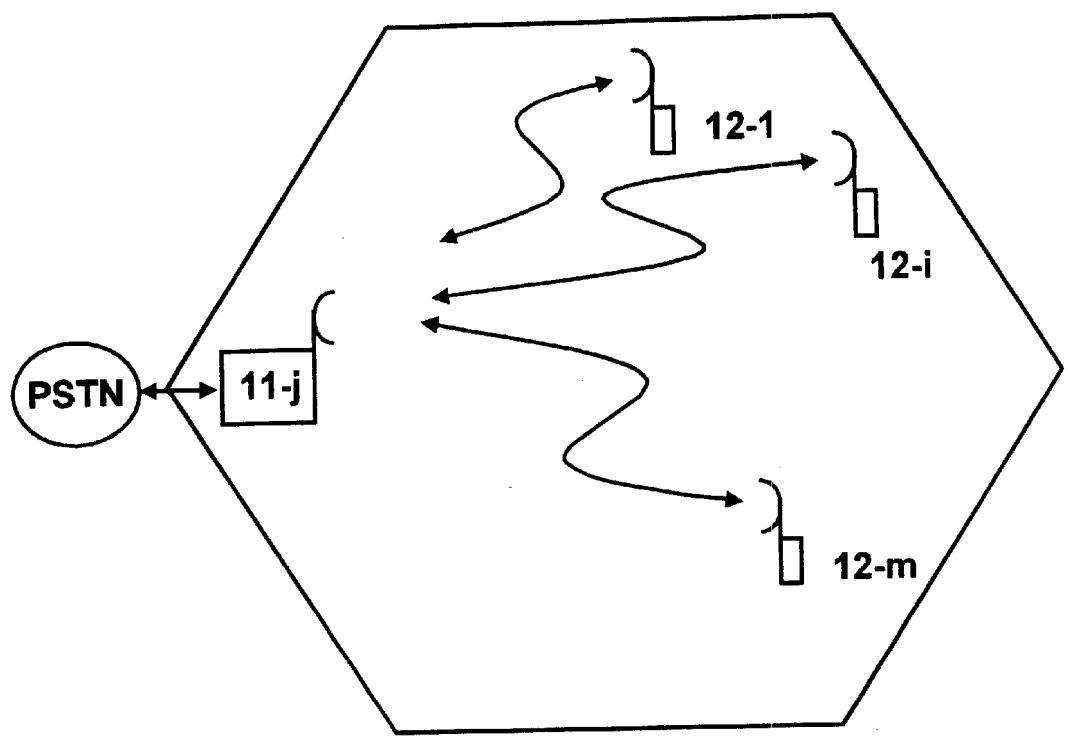
FIG. 1 shows a block diagram of a radiocommunications system according to the invention.

FIG. 1 shows a radiocommunications system which employs code division multiple access (CDMA) and time division multiple access (TDMA) techniques together, and which provides duplex communication between a set of fixed units 11-1 to 11-n and a set of fixed and/or mobile remote units 12-1 to 12-t.

The TD-CDMA system is divided into a plurality of cells in which each cell comprises at least one fixed unit 11-j, which is often connected via a cable network to a telephone transport network such as the public switched telephone network (PSTN), for example.

The fixed unit 11-j (where j =1, . . . , n) is able of maintaining and setting up simultaneously various radio links with a plurality of remote units 12-1 to 12-m located within its coverage area. In addition, the fixed unit 11-j is able of carrying out processes to ensure the correct execution of interworking functions, such as routing and forwarding, with the PSTN.

When there is a communication in process between the fixed unit 11-j and a remote unit 12-i (where i=1, . . . , m) that is within the coverage area of the fixed unit 11-j, said communication is effected over a radio channel characterised by a time slot of a TD-CDMA frame and a pseudo-random sequence or code. Said sequences are orthogonal or quasi-orthogonal with respect to each other. Therefore, over each time slot of a TD-CDMA frame it is possible to set up various communications simultaneously; see FIG. 2.

Figure 2:
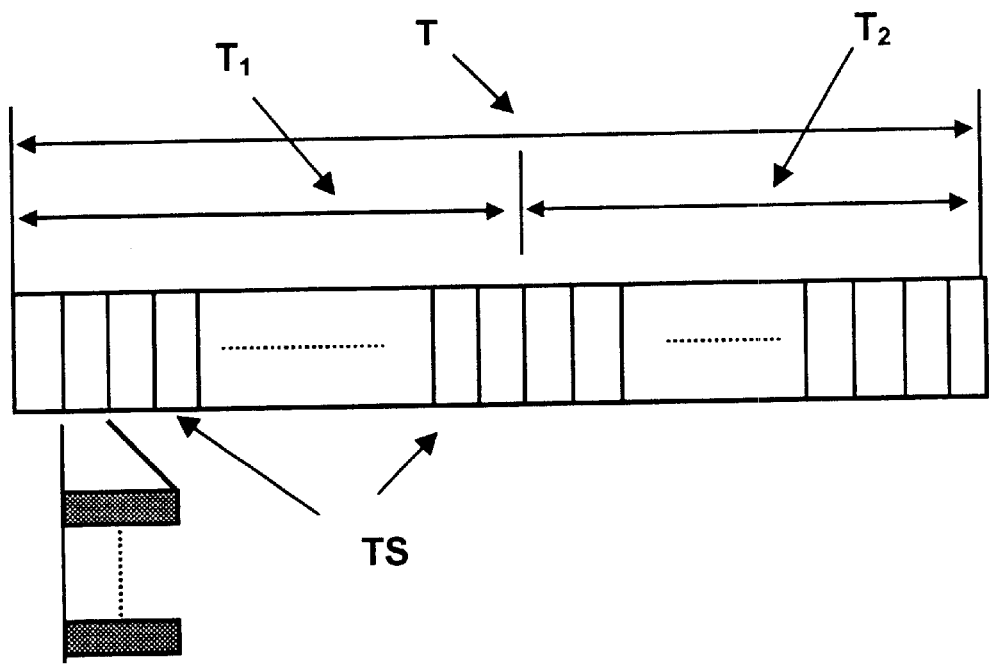
FIG. 2 shows the structure of a frame of the radiocommunications system in accordance with the state of the art.

FIG. 2 shows an example of a TD-CDMA frame, in which the TD-CDMA frame has a predetermined duration T, is divided into a set of time slots TS divided into at least two slot groups T1, T2, so that one group of time slots is for one transmission direction and the other group is for the other transmission direction. Consequently, there is at least one changeover point in the transmission direction within the TD-CDMA frame.

The fixed unit 11-j comprises a radio interface for transmitting and receiving radio signals, to and from the remote units 12-1 to 12-m distributed throughout its coverage area. Also, the remote unit 12-i comprises a radio interface.

In a first embodiment, the present invention is described in relation with the distribution of channels when an incoming call request arises. Nonetheless it is to be emphasised that the present invention is likewise applicable to the cases of allocating channels to calls in process, as well as to calls that will enter later, and channel allocation is done providing for such calls as long as the pertinent quality requirements are known.

The fixed unit 11-j has processor means programmed with an algorithm to manage the radio channels of the fixed unit 11-j, whereby the incoming call set-up requests are attended, even in those cases where for the allocation of a radio channel to the incoming call request it is necessary to hand over at least one call in process to another radio channel in the cell. It also optimises the channel distribution under operating conditions.

The processor hunts for a distribution of the radio channels occupied with calls in process, paying attention to the quality and bandwidth requirements of the users of the TD-CDMA system, i.e. as a function of the interference signal level in each time slot, of the transmission capacity (bit rate of signal to be transmitted) required by the users, and of signal power received by the remote units 12-1 to 12-m, among others.

When a user wishes to set up a communication, the remote unit 12-i to which he is connected, transmits through its radio interface a call set-up request. The incoming request is received in the fixed unit 11-j through its radio interface, whereupon it is communicated to the processor.

The processor examines the current occupancy status of the fixed unit 11-j. In order to perform the examination, the fixed unit 11-j maintains a list with the radio channels occupied with calls in process in each time slot of the TD-CDMA frame.

Once the call set-up request has been received by the processor, the latter initiates the examination of the incoming call set-up request, which includes the quality and the transmission capacity required, and inspects the list of radio channels occupied, in order to determine whether it is possible to allocate a free radio channel to the received request.

The incoming call request is attended immediately in the event that there is a radio channel free which meets the quality requirement. Said available radio channel would thereupon be allocated to the incoming call request.

It can also occur that even existing free capacity available for allocation by the fixed unit 11-j to the incoming call request, this does not take place immediately given the current spread of the radio channels available within the TD-CDMA frame.

The incoming request cannot be attended because none of the free radio channels offers a quality level higher than the minimum threshold required. This can arise either because the remote unit 12-i has high path losses, or because the remote unit 12-i requires a predetermined transmission capacity that, for example, needs the allocation of transmission capacity in two or more consecutive time slots of the TD-CDMA frame.

It is possible that the allocated radio channels belong to adjacent time slots or they may belong to the same time slot, among other possibilities.

As a result, the processor initiates a hunting process for a distribution of radio channels, which permits the incoming call set-up request to be attended.

Thus, at the instance of the processor the fixed unit 11-j orders handovers to be performed of as many occupied radio channels as are necessary in order to release occupied radio channels and thereby obtain a distribution of radio channels which permits the received call request to be satisfied, while maintaining the quality of service of the calls in process, or at least without degrading it significantly. The handover procedure takes place intra-cell (inside the same cell), for example.

Once the processor has determined, through examination of the incoming call request, the user requirements, and determined that it is not possible to allocate to the received request any of the free radio channels on the list, it indicates to the fixed unit 11-j that it should send a handover initiation message to the remote unit 12-i+1 which has a call in process over a radio channel within the time slot which has the quality level closest to that required by the incoming call request.

The fixed unit 11-j, over its radio interface, sends a handover initiation message to the implicated remote unit 12-i+1 for it to release the radio channel it is occupying. Of course, not all communications in process need migrate to another radio channel.

The handover procedure is known in the state of the art, for example in the book titled "Wideband CDMA for Third Generation Mobile Communications" by Tero Ojanperä and Ramjee Prasad, published by Artech House Publishers, section 5.14.2, incorporated in the present application by reference.

Once the handover procedure has been completed successfully, the fixed unit 11-j carries out the allocation of a radio channel in the time slot in which the remote unit 12-i+1 was operating.

The method of the present invention is of great interest in the case where an incoming call request requires the allocation of transmission capacity in two or more consecutive time slots.

Likewise, the processor determines the transmission capacity and quality required by analysing the incoming request and after conducting the analysis, sends the necessary information to the fixed unit 11-j for it to transmit the corresponding handover initiation messages to the remote units 12-1 to 12-m that they have to hand over their calls in process to other time slots.

When the required handover procedures have been successfully completed, the fixed unit 11-j allocates a radio channel to the incoming call request that comprises at least two time slots released.

The allocation of two or more time slots can be implemented to obtain an enhancement in the range covered by the cell of the fixed unit 11-j or also to attain a higher transmission rate.

From all the foregoing, it can be deduced that the selection of an occupied radio channel corresponding to a time slot having the quality closest to that required in the call to which it is desired to allocate a channel is a selection criterion. Nonetheless for the purposes of the present invention other selection criteria can be employed in order to distribute channels as a function of the requirement in each case.

Thus, an alternative selection criterion can consist in the selection of a channel that corresponds to a time slot in such a manner that the release of its corresponding channel requires the least possible number of handovers. Consequently, it may be affirmed that from among the various possibilities of releasing channels by handing these over to other time slots, the channel selected is that whose handover process requires the least possible number of handovers to be carried out.

Another alternative criterion can consist in releasing a channel which corresponds to a first time slot which is adjacent in time to a second time slot. In this manner, a double time slot is formed in order to be allocated to a call requiring such condition.

As has been stated above, the present invention is equally applicable to the cases in which it is desired to allocate a channel to a call which has not yet taken place and it is foreseen it will occur at a later moment. In this case, there is logically still no call request, nevertheless as long as the quality requirements that correspond to said call are known beforehand, it shall be possible to proceed in a like manner to that described above for the incoming call case, for which reason the implementation of this embodiment shall be possible for an expert in the art starting from the information available in the case of the incoming call. In practice, this method would be of application for offering services to user calls that require a defined level of quality for communication, for which reason said quality requirements shall be known beforehand, therefore doing it possible to make the allocation without delays.

Likewise, the present invention is also applicable to the cases in which it is a matter of reallocating a channel to a call in process. The manner of selecting channels would be analogous to that described above for the incoming call case, for which reason the implementation of this embodiment shall also be possible for an expert in the art starting from the information available in the case of the incoming call. In this case, the quality requirements associated with the call in process are already known to the fixed unit. In this manner, it shall be possible to manage channel distribution in a continuous or discontinuous fashion according to practical needs and, in any case, it shall be possible to optimise the transmission resources through an intelligently conducted channel allocation process.

What is claimed is:

1. A method for distributing radio channels in a radio communications system which comprises at least one fixed unit and a plurality of remote units, said fixed unit allocating radio channels to said remote units, wherein each radio channel corresponds to a time slot of a frame having predetermined quality requirements and a pseudo-random sequence, and a channel is allocated to an incoming call, or to a foreseen incoming call, or to a call in process, the method comprising the steps of:

a) setting-up of a list of radio channels occupied with calls in process based on said quality requirements;

b) analyzing said quality requirements of a call to which it is desired to allocate a radio channel;

c) comparing said analysis of the quality requirements of the call with said list in order to find on said list an occupied radio channel in accordance with a predetermined selection criterion;

d) releasing the occupied radio channel of said time slot; and e) allocating to said call the released radio channel within said time slot.

2. The method for distributing radio channels according to claim 1, wherein the step of releasing said occupied radio channel includes executing a handover procedure ordered by said fixed unit.

3. The method for distributing radio channels according to claim 2, wherein said predetermined selection criterion comprises the selection of a channel which corresponds to a first time slot which is adjacent in time to a second time slot.

4. The method for distributing radio channels according to claim 2, wherein the handover procedure sets up the call in process over another radio channel included within another time slot of said frame.

5. The method for distributing radio channels according to claim 4, further comprising the step of generating a handover procedure initiation message.

6. The method for distributing radio channels according to claim 1, wherein said predetermined selection criterion comprises the selection of a channel which corresponds to a time slot which has the quality closest to that required in said call to which it is desired to allocate a channel.

7. The method for distributing radio channels according to claim 2, wherein said selection criterion comprises the selection of a channel which corresponds to a time slot whose corresponding channel is released with a number of handovers which is the lowest from among all the possible numbers of handovers to be performed.

8. The method for distributing radio channels according to claim 1, wherein said predetermined quality requirements correspond to bit rate.

9. The method for distributing radio channels according to claim 1, wherein said predetermined quality requirements correspond to transmission power.

10. The method for distributing radio channels according to claim 1, wherein the method is applied to CDMA communications systems.

11. A system for distributing radio channels in a radio-communications system which comprises at least one fixed unit and a plurality of remote units, said fixed unit being adapted to allocate radio channels to said remote units, wherein a radio channel corresponds to a time slot of a frame having predetermined quality requirements and a pseudo-random sequence, and the system for distributing radio channels is adapted to allocate a channel to an incoming call, or to a foreseen incoming call, or to a call in process, the system for distributing radio channels comprising:

a) means for setting-up a list of radio channels occupied with calls in process based on said quality requirements;

b) means for analyzing the quality requirements of a call to which it is desired to allocate a channel;

c) means for comparing said analysis with said list in order to find on said list an occupied radio channel in accordance with a predetermined selection criterion;

d) means for releasing said occupied radio channel of said time slot; and e) means for allocating to said call the released radio channel within said time slot.

12. The system for distributing radio channels according to claim 11, wherein the means for setting-up a list of radio channels occupied with calls in process are included in said fixed unit.

13. The system for distributing radio channels according to claim 11, wherein the means for releasing an occupied radio channel are included in said fixed unit.

14. The system for distributing radio channels according to claim 13, wherein said means for releasing an occupied radio channel generate an initiation message for a handover procedure.

15. The system for distributing radio channels according to claim 11, wherein the means for allocating a channel to said call are included in said fixed unit.

16. The system for distributing radio channels according to claim 11, wherein the means for analysing the quality requirements are incorporated in said fixed unit.

17. The system for distributing radio channels according to claim 11, wherein the system is applied to CDMA communications systems.

18. A fixed unit for distributing radio channels among a plurality of remote units in a radio-communications system, said fixed unit, wherein a radio channel corresponds to a time slot of a frame having predetermined quality requirements and a pseudo-random sequence, and the fixed unit is adapted to allocate a channel to an incoming call, or to a foreseen incoming call, or to a call in process, the fixed unit comprising:

a) means for setting-up a list of radio channels occupied with calls in process based on said quality requirements;

b) means for analyzing the quality requirements of a call to which it is desired to allocate a channel;

c) means for comparing said analysis with said list in order to find on said list an occupied radio channel in accordance with a predetermined selection criterion;

d) means for releasing said occupied radio channel of said time slot; and e) means for allocating to said call the released radio channel within said time slot.

19. The fixed unit according to claim 18, wherein the means for releasing said occupied radio channel orders a remote unit using said occupied channel to execute a handover procedure.

* * * * *